(12) United States Patent
Takezawa

(10) Patent No.: US 6,578,923 B2
(45) Date of Patent: Jun. 17, 2003

(54) SEAT BACK FOR A VEHICLE

(75) Inventor: Kiyoshi Takezawa, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 10/079,424

(22) Filed: Feb. 22, 2002

(65) Prior Publication Data

US 2002/0117882 A1 Aug. 29, 2002

(30) Foreign Application Priority Data

Feb. 23, 2001 (JP) ........................................ 2001-049179

(51) Int. Cl.[7] .................................................. A47C 7/02
(52) U.S. Cl. ................................................. 297/452.58
(58) Field of Search ...................... 297/452.38, 452.58, 297/452.6, 452.62, 218.1

(56) References Cited

U.S. PATENT DOCUMENTS 2,844,192 A * 7/1958 Marquez
3,188,663 A * 6/1965 Conrad
4,643,480 A * 2/1987 Morita
5,338,098 A * 8/1994 Ohnishi
5,641,204 A * 6/1997 Lhuissier et al.
6,003,939 A * 12/1999 Nakai et al.

* cited by examiner

*Primary Examiner*—Milton Nelson, Jr.
(74) *Attorney, Agent, or Firm*—Lowe Hauptman Gilman & Berner, LLP

(57) ABSTRACT

A vehicle seat covering system that results in a vehicle seat having a good appearance with a simple mechanism, wherein a seat-cover assembly evenly covers the seat-pad assembly on the side parts of the seat, closely fitting to the shape of the seat-pad assembly. The seat-cover assembly has a main part and side parts that are sewn along the boundaries of the main part and side parts. The vehicle seat covering system is equipped with (a) side-part pulling tubes that have a shape of along tube and that are sewn onto the boundaries between the main part and the side parts, and (b) pulling parts that have an u-shape or somewhat circular shape and that penetrate the side-part pulling tubes in the longitudinal direction thereof, and one end or both ends of which is/are pulled to the side of the seat-pad assembly in its longitudinal direction.

10 Claims, 6 Drawing Sheets

(a)

(b)

(a)

(b)

(a)

(b)

(a)

(b)

(c)

(d)

SEAT BACK FOR A VEHICLE

BACKGROUND OF THE INVENTION

1. Field of the Invention

The present invention relates to a vehicle seat covering system.

2. Description of the Related Art

In a conventional system for covering a vehicle seat for a vehicle (hereinafter referred to as "vehicle seat covering system"), a pulling wire as shown in FIGS. 6–8 is mostly used.

A seat assembly 3 is constituted in such a way that a seat-cover assembly 1 covers a seat-pad assembly 2.

As to a vehicle seat covering system with elevated round parts, if the boundary between the side parts 1b and the main part 1a of the seat-cover assembly 1 is not affixed, the seat-cover assembly 1 at the boundary (of a concave shape) does not snugly fit the seat-pad assembly 2, resulting in a bad appearance of the seat cover. Thereby, complicated processing operations as described below must be performed.

FIG. 6 is a front view of a seat-cover assembly of a vehicle seat covering system (hereinafter referred to as "seat-cover assembly") where a conventional pulling wire is used, and FIG. 7 is a front view of a seat-pad assembly of a vehicle seat covering system (hereinafter referred to as "seat-pad assembly") where a conventional pulling wire is used. FIG. 8(a) is a front view of a vehicle seat where a conventional pulling wire is used, and FIG. 8(b) is a partial section view taken along a line B—B in FIG. 8(a).

In the central main part 3a and side parts 3b of the seat assembly 3, end wires 5 that penetrate through pulling tubes 4, which are sewn and fixed in a cylindrical shape on the back side of the seat-cover assembly 1, are fixed with C-rings 7 to an insert wire 6 arranged on the bottom of a pulling groove 2c of the seat-pad assembly 2, as shown in FIG. 8(b).

In addition to the above-mentioned method, the side parts 3b of the seat assembly 3 can also be fixed by a pulling elastic string as shown in FIGS. 9–11. FIG. 9(a) is a front view of a seat-cover assembly where a conventional pulling elastic string is used, and. FIG. 9(b) is a partial (lower part) rear view of FIG. 9(a). FIG. 10 is a front view of a seat-pad assembly in which a conventional pulling elastic string is used. FIG. 11(a) is a front view of a vehicle seat covering system where a conventional pulling elastic string is used; FIG. 11(b) is a partial (lower part) rear view of FIG. 11(a;) FIG. 11(c) is a partial section view taken along a line C—C of FIG. 11(a) ("F" means the front side and "R" means the rear side), and FIG. 11(d) is a partial view seen from the rear side R of FIG. 11(c). This fixing method with a pulling elastic string also requires processing operations similar to those of the above-mentioned method with a pulling wire. That is to say, the upper part of the pulling elastic string 8 is hooked and fixed on the end wire 5 of the seat-cover assembly 1, and the lower part of the pulling elastic string 8 is hooked and fixed on the rear-side wire 10 of the seat-cover assembly 1 as shown in FIGS. 11(c) and 11(d).

3. Problems to be Solved by the Invention

The above-mentioned prior art has the following problems. Processing operations mentioned in the above are required to prevent the seat-cover assembly 1 of the seat assembly 3 from separating from the seat-pad assembly 2 at the boundaries (of a concave shape) between the main part 3a and the side parts 3b.

In the case of a seat having elevated round parts on its sides, such as the backrest of a front seat, even if the side parts 1b are fixed with C-rings 7 and a pulling elastic string 8, the seat-cover assembly 1 can separate from the seat-pad assembly 2 due to low rigidity or deformation of the end wire 5, as well as because of slackness in the fixing part of the insert wire 6 or the pulling elastic string 8, resulting in difficulty in performing pulling perfectly.

SUMMARY OF THE INVENTION

In order to solve the above-mentioned problems, one object of the present invention is to provide a vehicle seat covering system that has a good appearance and a simple mechanism, wherein a seat-cover assembly closely and evenly covers the seat-pad assembly on the side parts of the seat.

For the purpose of solving the aforementioned problems, the present invention provides a vehicle seat covering system wherein a seat-cover assembly whose side parts and main part are sewn at the boundaries covers the seat-pad assembly, with the vehicle seat covering system equipped with (a) side-part pulling tubes that are formed into a long tube along the longitudinal direction of the boundaries between the side parts and the main part and are sewn to the boundaries, and (b) pulling parts that have a u-shape or somewhat circular shape and that penetrate the side-part pulling tubes along the longitudinal direction thereof and one end or both ends of which is/are pulled on the seat-pad assembly's side in its longitudinal direction.

The vehicle seat covering system is also characterized such that the sewn parts at the boundaries between the side parts and the main part are pulled in such a way that the sewn parts can be positioned inside the pulling groove of the seat-pad assembly.

The vehicle seat covering system is also characterized such that the pulling part has a U-shaped section or some other two-dimensional-shaped section and is made of a thin material having appropriate rigidity.

BRIEF DESCRIPTION OF THE DRAWINGS

FIG. 9(*b*) is a partial (lower part) rear view of FIG. 9(*a*).

FIG. 11(*b*) is a partial (lower part) rear view of FIG. 11(*a*);

FIG. 11(*c*) is a partial section view taken along line C—C of FIG. 11(*a*); and FIG. 11(*d*) is a partial appearance view seen from the rear side R of FIG. 11(*c*).

DESCRIPTION OF THE PREFERRED EMBODIMENT

One embodiment of the present invention will be described in detail with reference to the accompanying drawings.

Figure 1:
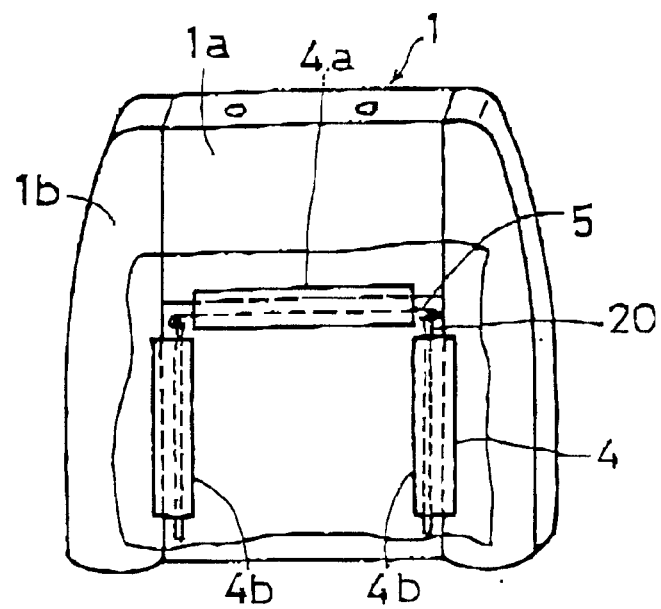
FIG. 1 is a front view of a seat-cover assembly in one embodiment of the present invention.
Figure 2:
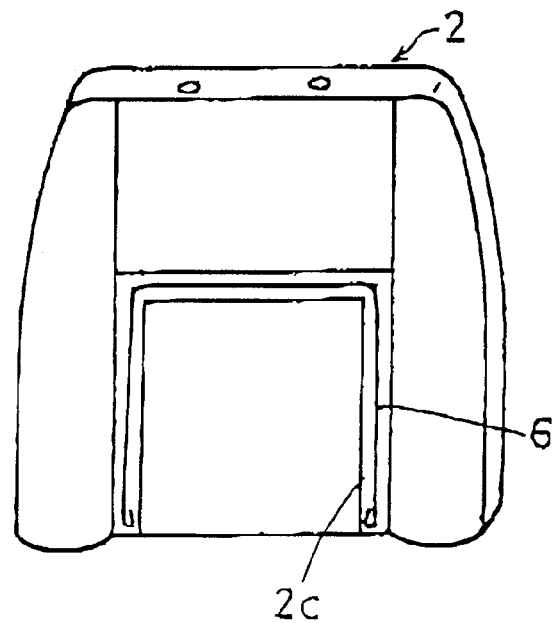
FIG. 2 is a front view of a seat-pad assembly in one embodiment of the present invention.
Figure 3:
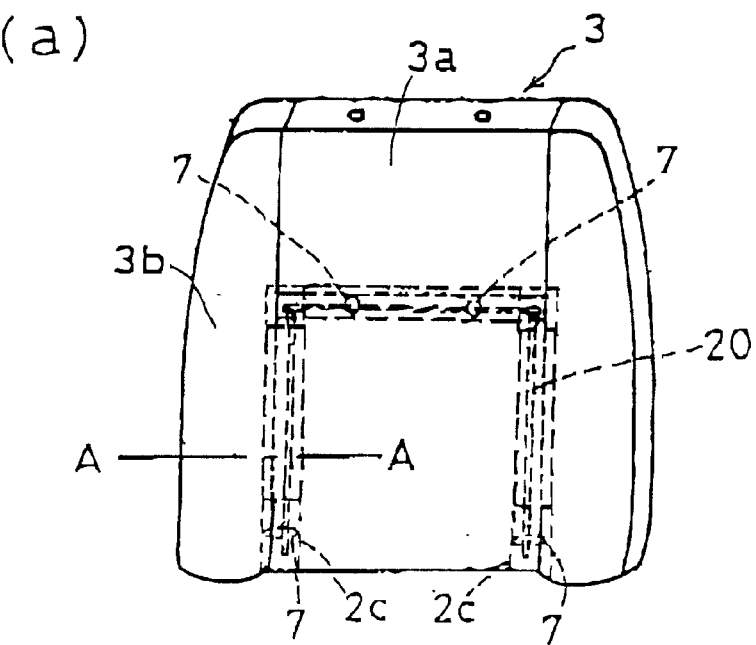
FIG. 3(a) is a front view of a seat in one embodiment of the present invention.
FIG. 3(b) is a partial section view taken along line A—A of FIG. 3(a).
Figure 3:
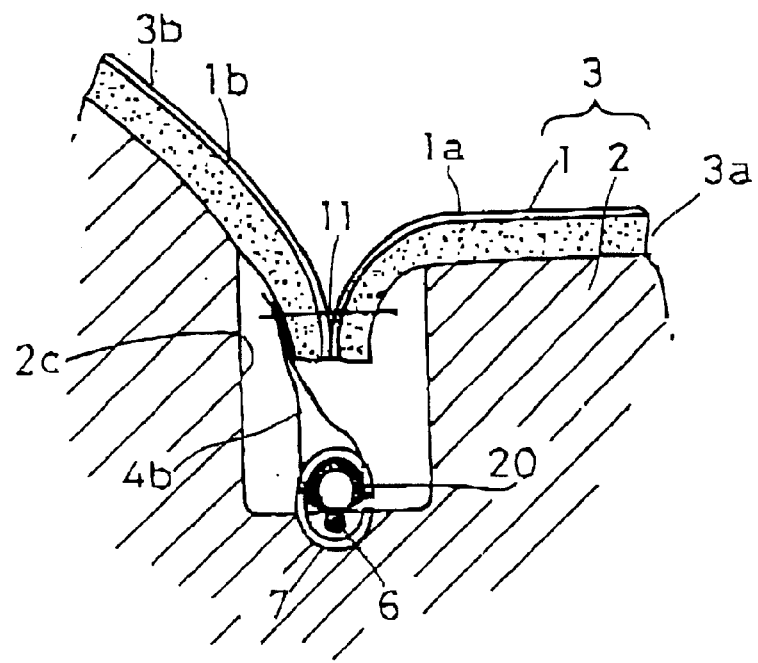

FIG. 1 is a front view of a seat-cover assembly 1 of a vehicle seat assembly (hereinafter referred to simply as "seat assembly") 3 in one embodiment of the present invention. FIG. 2 is a front view of a pad assembly 2 of a seat assembly 3 in one embodiment of the present invention. FIG. 3(*a*) is a front view of a seat in one embodiment of the present invention, and FIG. 3(*b*) is a partial section view taken along line A—A in FIG. 3(*a*).

Figure 6:
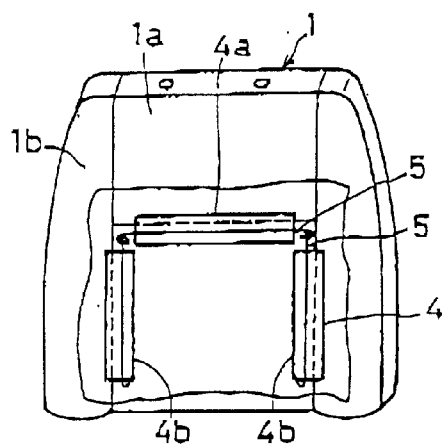
FIG. 6 is a front view of a seat-cover assembly in a conventional method using a pulling wire.
Figure 7:
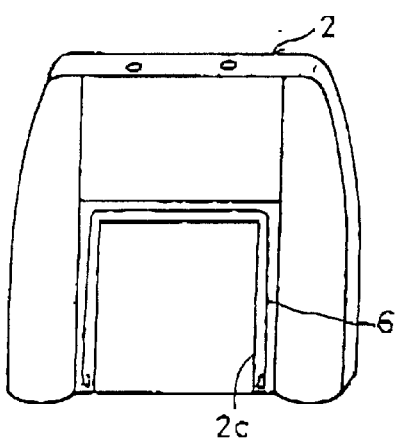
FIG. 7 is a front view of a seat-pad assembly in a conventional method using a pulling wire.
Figure 8:
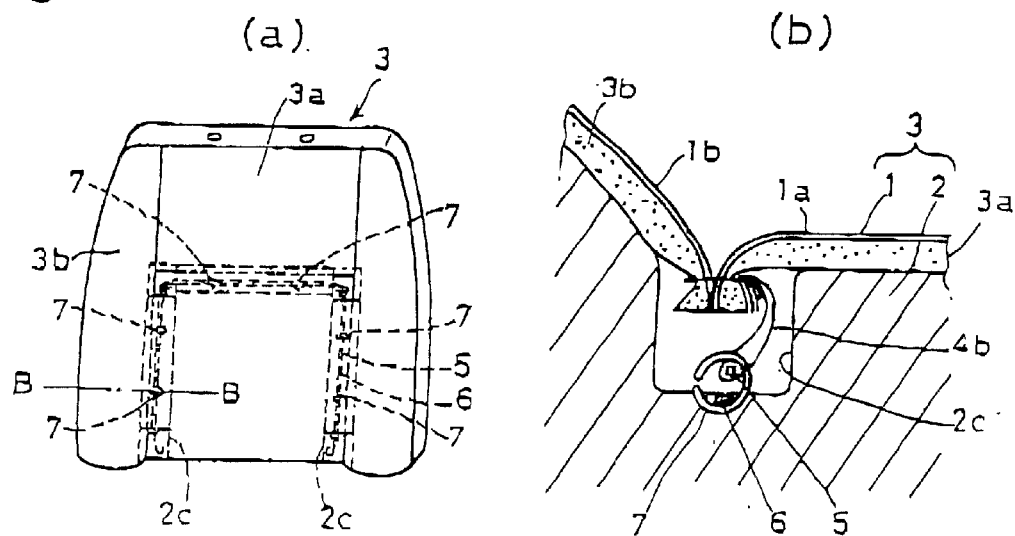
FIG. 8(a) is a front view of a seat in a conventional method using a pulling wire.
FIG. 8(b) is a partial section view taken along line B—B of FIG. 8(a).
Figure 9:
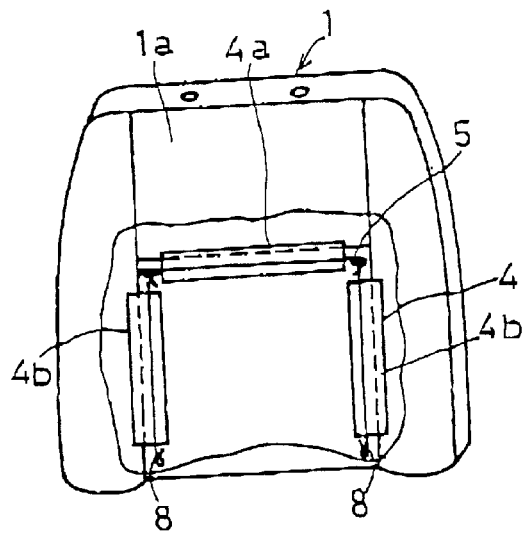
FIG. 9(*a*) is a front view of a seat-cover assembly in a conventional method using a pulling elastic string.
Figure 9:
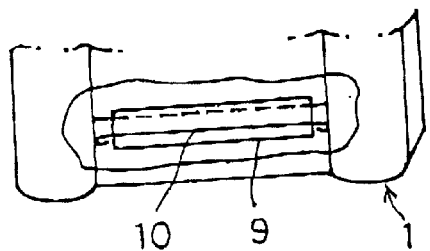
Figure 10:
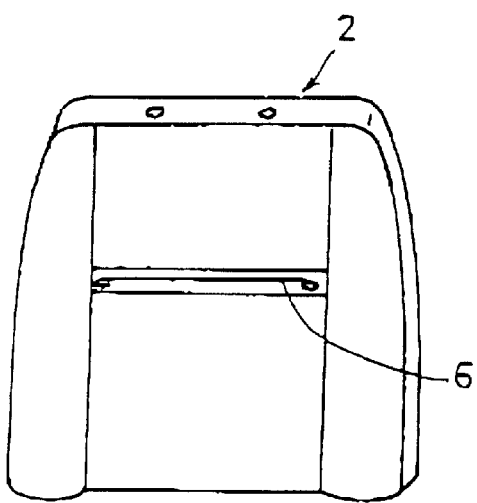
FIG. 10 is a front view of a seat-pad assembly in a conventional method using a pulling elastic string.
Figure 11:
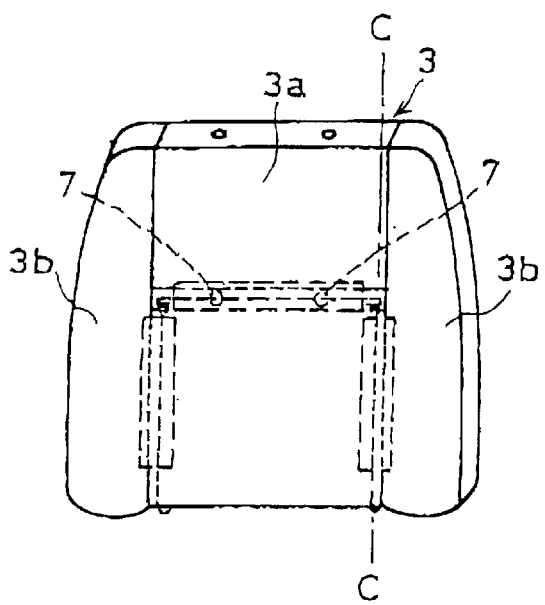
FIG. 11(*a*) is a front view of a seat in a conventional method using a pulling elastic string.
Figure 11:
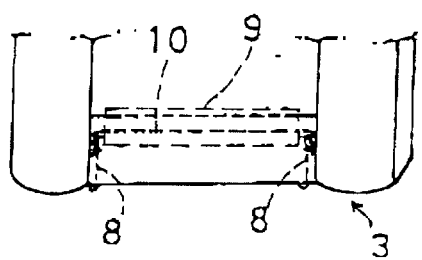
Figure 11:
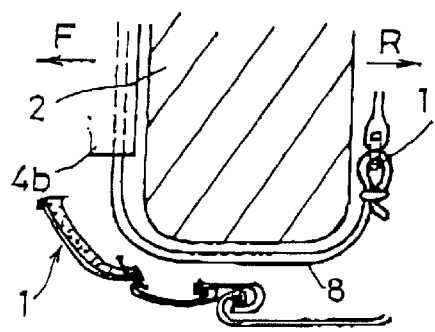
Figure 11:
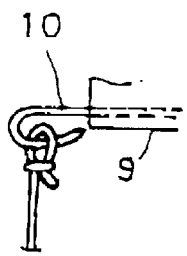

The main part 3*a* of the seat assembly 3 in one embodiment of the present invention is covered in such a way that a pulling wire is used (see FIG. 6), just as in a conventional method. Therefore, a detailed description of the covering method of the present invention will not be provided here.

The end wire 5 for pulling the main part 1*a* is inserted into the main-part pulling tubes 4*a* that is installed horizontally on the rear side of the main part 1*a* of the seat-cover assembly 1, and is fixed with C-rings 7 onto the insert wire 6 that is arranged on the bottom side of the pulling groove 2*c* of the seat-pad assembly 2.

The side parts 3*a* of the seat assembly 3 in one embodiment of the present invention will now be described in detail.

Figure 4:
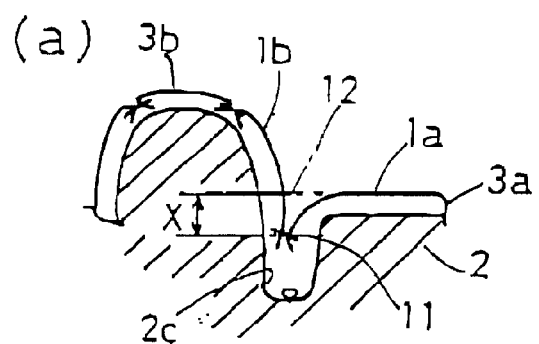
FIG. 4(a) is an explanatory view (partial section view) showing a sewn part of the cover of the seat in one embodiment of the present invention.
FIG. 4(b) is an explanatory view (partial section view) showing a sewn part of a cover of a conventional vehicle seat covering system.
Figure 4:
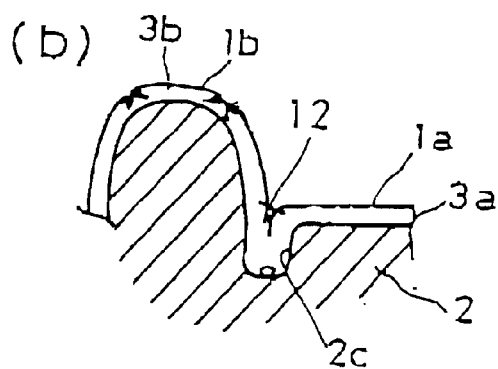

FIG. 4(*a*) is an explanatory view (partial section view) showing the sewn part of the cover of the seat in one embodiment of the present invention, and FIG. 4(*b*) is an explanatory view (partial section view) showing the sewn part of the cover of a conventional vehicle seat covering system.

As shown in FIG. 4(*a*), when the main part 1*a* and the side parts 1*b* (corner parts) of the seat-cover assembly 1 are sewn at the boundaries between the main part 1*a* and the side parts 1*b*, the sewn part 11 of the main part 1*a* and the side part 1*b* is positioned inside the pulling groove 2*c* (concave part) at the boundary between the main part and the side parts, and the position of the sewn part 11 is deeper than that of a conventional sewn part 12 (which is shown in FIG. 4(*b*)) by a pulling depth X, so that the material of the main part 1*a* and the side parts 1*b* can be pulled so as to result in an attractive appearance of the covered seat.

As shown in FIGS. 1 and 3, the side-part pulling tubes 4*b*, which are formed into a cylindrical shape and sewn in the form of a long tube between and connecting the side parts 1*b* and the main part 1*a* of the seat-cover assembly 1, are fixed to the sewn part 11 at the rear-side bottom of the side part 1*b* and the main part 1*a*, and the pulling parts 20, which have an appropriate length and rigidity for pulling the side parts 1*b* and the main part 1*a*, are inserted through the side-part pulling tubes 4*b*.

Figure 5:
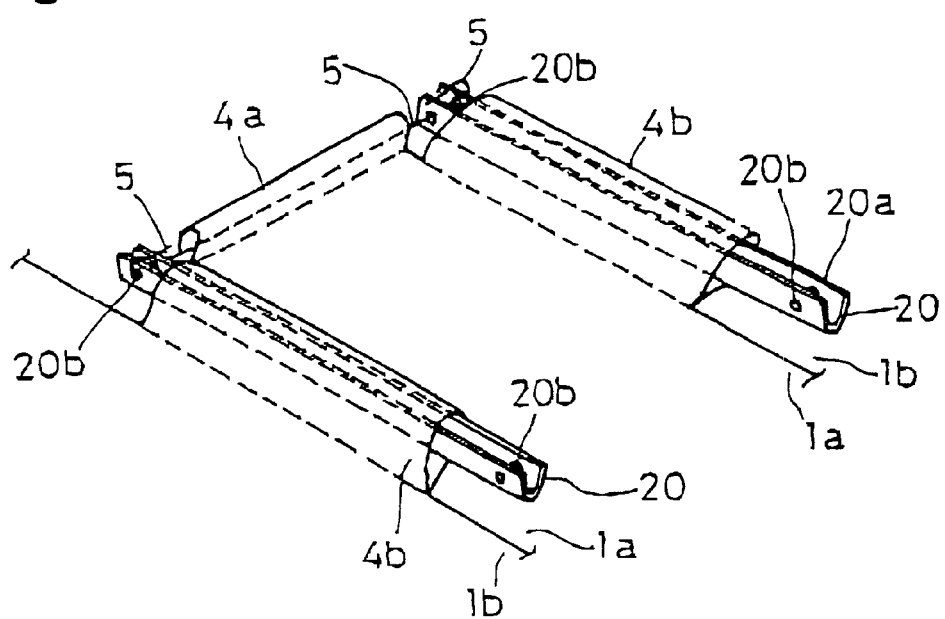
FIG. 5 is an explanatory view showing how an end wire and pulling parts are set onto a seat-cover assembly in one embodiment of the present invention.

FIG. 5 is an explanatory view showing how the end wires 5 and the pulling parts 20 are set on the seat-cover assembly 1 of the seat assembly 3 in one embodiment of the present invention.

It is desirable that the pulling parts 20, which have an approximate U-shape or circular shape, be arranged in the longitudinal direction, and that they have a thin and light structure having appropriate rigidity. In FIG. 5, the opening 20*a* of the pulling part 20 is arranged in such a way that the opening 20*a* faces the seat-pad assembly 2, which is made of urethane rubber or the like. The extremity of the end wire 5 of the main part 1*a* is inserted into a wire hole 20*b* at the upper end of the pulling part 20, so that the end wire 5 and the pulling part 20 can be connected and affixed to each other.

In the last stage of the cover-sewing process, the bottom end of the pulling part 20 is fixed by the C-rings 7 onto the insert wire 6 arranged at the bottom of the pulling groove 2*c* of the seat-pad assembly 2, as shown in FIGS. 3(*a*) and 3(*b*). At this time, the side-part pulling tubes 4*b* are seven onto the sewn part 11 at the bottom end on the rear side of the seat-cover assembly 1 in such a way that the pulling parts 20 can have tension, and the sewn part 11 at the bottom end of the seat-cover assembly 1 is pulled in the inward direction in the concave pulling groove 2*c* at the boundary on the rear side, as shown in FIG. 3(*b*).

Effects of the Invention

As described in detail above, the present invention has the following superior effects, which cannot be obtained by the conventional methods.

(1) Pulling parts having appropriate rigidity are arranged on the deep bottom end of the concave pulling groove at the boundaries between the side parts and the main part of the seat-cover assembly, and the bottom end of the seat-cover assembly is pulled in the rear direction so that the seat-cover assembly can be closely and evenly attached to the seat-pad assembly. Thus, even in the case of a seat that has especially elevated round parts, the seat-cover assembly does not separate from the seat-pad assembly, thereby improving the appearance of the seat.

(2) In covering the seat-side parts, even and deep pulling is possible without increasing the number of parts. The number of parts that are necessary in the process of this invention need not be more than the number of parts that are necessary in a conventional process.

(3) When the pulling parts are fixed onto the insert wires of the seat-pad assembly by the C-rings, the ends of the pulling parts contact with the concave pulling groove of the seat-pad assembly, and the C-rings cause the shape of the pulling parts to be altered. Therefore, displacement of the seat-cover assembly against the seat-pad assembly is prevented.

Explanation of Numbers in the Drawings

1 seat-cover assembly
1*a* main part (of a seat cover)
1*b* side parts (of a seat cover)
2 seat-pad assembly
2*c* pulling groove
3 vehicle seat assembly
3*a* main part (of a vehicle seat)
3*b* side part (of a vehicle seat)
4 pulling tubes 4a main-part pulling tubes
4b side-part pulling tubes
5 end wire
6 insert wire
7 C-ring
8 pulling elastic string
9 rear-side pulling tubes
10 rear-side wire
11,12 sewn part (of seat-cover assembly)
20 pulling part
20a opening (of pulling part)
20b wire hole (of pulling part)
D lower part
F front side
R rear side
U upper part
X pulling depth

What is claimed is:

1. A seat covering system, comprising:
   a seat-pad;
   a seat-cover covering said seat-pad, said seat-cover comprising at least one side part and a main part, said side part and main part being joined together along a common boundary;
   at least one side-part pulling tube positioned along the boundary of the side part and the main part, said pulling tube being joined to one of the main part and the side part along the boundary; and
   a pulling part having an U-shaped cross section, said pulling part extending through the side-part pulling tube and having at least one end which is pulled towards the seat-pad.

2. A seat covering system as defined in claim 1, wherein respective joined portions of the side part and the main part, which joined portions are joined together along the boundary, are pulled in such a way that the joined portions are positioned inside a pulling groove of the seat-pad.

3. A seat covering system as defined in claim 1, wherein the pulling part is made of a material having an appropriate rigidity.

4. A seat covering system as defined in claim 1, wherein the seat-pad is a seat-pad of a vehicle seat.

5. A seat covering system as defined in claim 1, wherein said side part and main part are sewn together along the boundary.

6. A seat covering system, comprising:
   a seat-pad;
   a seat-cover covering said seat-pad, said seat-cover comprising at least one side part and a main part, said side part and main part being joined together along a common boundary;
   at least one side-part pulling tube positioned along the boundary of the side part and the main part, said pulling tube being joined to one of the main part and the side part along the boundary; and
   a pulling part having a circular cross section, said pulling part extending through the side-part pulling tube and having at least one end which is pulled towards the seat-pad.

7. A seat covering system as defined in claim 6, wherein respective joined portions of the side part and the main part, which joined portions are joined together along the boundary, are pulled in such a way that the joined portions are positioned inside a pulling groove of the seat-pad.

8. A seat covering system as defined in claim 6, wherein the pulling part is made of a material having an appropriate rigidity.

9. A seat covering system as defined in claim 6, wherein the seat-pad is a seat-pad of a vehicle seat.

10. A seat covering system as defined in claim 6, wherein said side part and main part are sewn together along the boundary.

* * * * *